United States Patent
Barmichev et al.

(10) Patent No.: US 11,820,487 B2
(45) Date of Patent: Nov. 21, 2023

(54) AIRCRAFT CONFIGURATION WITH TALL AFT CARGO SECTION AND REAR ACCESS

(71) Applicant: The Boeing Company, Chicago, IL (US)

(72) Inventors: Sergey D. Barmichev, Kirkland, WA (US); Mithra M. Sankrithi, Bremerton, WA (US)

(73) Assignee: THE BOEING COMPANY, Arlington, VA (US)

( * ) Notice: Subject to any disclaimer, the term of this patent is extended or adjusted under 35 U.S.C. 154(b) by 76 days.

(21) Appl. No.: 17/540,504

(22) Filed: Dec. 2, 2021

(65) Prior Publication Data

US 2022/0363366 A1 Nov. 17, 2022

Related U.S. Application Data

(60) Provisional application No. 63/133,479, filed on Jan. 4, 2021.

(51) Int. Cl.
| | |
|---|---|
| *B64C 1/22* | (2006.01) |
| *B64C 1/18* | (2006.01) |
| *B64C 1/20* | (2006.01) |
| *B64C 1/10* | (2006.01) |

(52) U.S. Cl.
CPC ............ *B64C 1/22* (2013.01); *B64C 1/10* (2013.01); *B64C 1/18* (2013.01); *B64C 1/20* (2013.01)

(58) Field of Classification Search
CPC ........... B64C 1/22; B64C 1/1415; B64C 1/18; B64C 1/20; B64C 1/10
See application file for complete search history.

(56) References Cited

U.S. PATENT DOCUMENTS

| | | | |
|---|---|---|---|
| 3,002,719 A | 10/1961 | Weiland et al. | |
| 3,055,620 A * | 9/1962 | Weiland | B64C 1/1415 292/341.15 |
| 3,836,101 A * | 9/1974 | Mattia | B64C 1/1415 14/71.5 |
| 3,920,205 A | 11/1975 | Bell | |

(Continued)

FOREIGN PATENT DOCUMENTS

FR 2960514 A1 12/2011

OTHER PUBLICATIONS

EP Search Report dated May 17, 2022 in re EP Application No. 21217349.6.

*Primary Examiner* — Rodney A Bonnette
(74) *Attorney, Agent, or Firm* — COATS & BENNETT, PLLC

(57) ABSTRACT

An aircraft has an aft main cargo cabin with a low deck floor, and a rear access configured to provide access to the aft main cargo cabin from behind the fuselage. The deck floor of the aft main cargo cabin is lower than a first deck floor of a forward main cabin of a forward section of the fuselage. The aft main cargo cabin has a second height that is greater than the first height of the forward main cabin, allowing the aft main cargo cabin to accommodate oversize cargo with larger dimension(s). The aircraft may be built with such an aft main cargo cabin and rear access, or may be a modified aircraft that includes such an aft main cargo cabin and rear access. Related methods of reconfiguring a base aircraft into a modified aircraft having such an aft main cargo cabin and rear access are also disclosed.

20 Claims, 8 Drawing Sheets

(56) References Cited

U.S. PATENT DOCUMENTS

| | | | |
|---|---|---|---|
| 5,106,038 A | | 4/1992 | Dupont |
| 5,779,296 A | * | 7/1998 | Hewko ................ A61G 3/0866 244/118.6 |
| 6,497,388 B1 | | 12/2002 | Friend et al. |
| 9,108,719 B2 | | 8/2015 | Sankrithi et al. |
| 9,452,817 B1 | | 9/2016 | Sankrithi |
| 10,589,836 B2 | | 3/2020 | Sankrithi et al. |
| 10,850,844 B2 | * | 12/2020 | Corbett .................... B64C 1/20 |
| 2009/0045288 A1 | | 2/2009 | Nakamura et al. |
| 2009/0308974 A1 | | 12/2009 | Wagner |
| 2011/0226899 A1 | | 9/2011 | Cazals |
| 2020/0247545 A1 | * | 8/2020 | Vollers ................... B64D 11/00 |
| 2021/0331796 A1 | * | 10/2021 | Moreau ................ B64D 27/02 |

* cited by examiner

AIRCRAFT CONFIGURATION WITH TALL AFT CARGO SECTION AND REAR ACCESS

RELATED APPLICATIONS

This application claims benefit of U.S. Provisional Patent Application No. 63/133,479 filed Jan. 4, 2021, the entire contents of which are incorporated herein by reference.

TECHNOLOGICAL FIELD

The present disclosure relates generally to aircraft fuselage configurations, and deals more particularly with an aircraft having an increased height aft cargo section with a deck floor level that is lower than the main deck floor level in the forward section of the aircraft fuselage, and a rear access configured to provide access to the aft cargo section from behind the fuselage, to accommodate "oversize" cargo with one or more larger dimensions.

BACKGROUND

The operating efficiency of commercial and military aircraft may depend upon the efficient use of the volume of space within the aircraft's fuselage. Optimizing the use of fuselage volume may allow the aircraft to carry higher payloads of passengers and/or cargo. The ability to carry higher revenue payloads reduces the ratio of operating expenses relative to revenue. The challenge of optimizing the use of available fuselage volume is complicated by various types of cargo that may need to be carried. In some situations, cargo can be placed in standardized size containers (e.g., Unit Load Devices (ULDs) such as full size LD-3 cargo containers, or reduced height cargo containers like LD3-45, LD3-45W, LD3-46, LD3-46W). Other cargo may be in pallet form and/or bulk cargo. Still other cargo may be large items, with dimensions such as height, width, length, cross-sectional area, and/or volume, that are difficult to accommodate in conventional cargo holds.

In the past, the ability to handle "oversize" cargo has been increased by, for example, changing the outer cross-sectional profile of the fuselage, such as by creating a "bulging fuselage" found in existing large cargo aircraft. However, such changes often substantially change aircraft fuselage aerodynamic drag, aircraft fuselage weight, takeoff and landing parameters, and sometimes involves a redesign of aircraft wings and/or the use of different engines. Thus, such approaches can involve significant redesign of aircraft structural components, performance and efficiency losses and increased costs due to the changes in fuselage surface geometry including the fuselage outer mold line (OML) surface loft.

Accordingly, there remains a need for alternative approaches to aircraft fuselage configurations that allow for large dimension cargo, advantageously leveraging inventive approaches that make minimized changes to fuselage surface geometry to minimize performance and fuel efficiency losses and reduce implementation costs.

SUMMARY

Aspects of the present disclosure are generally directed to an aircraft that has an aft cargo section having an aft main cargo cabin with a low deck floor, and a rear access configured to provide access to the aft main cargo cabin from behind the fuselage, to accommodate cargo with one or more larger dimensions. The aircraft may be built with such an aft main cargo cabin and rear access, or may be a modified aircraft that includes such an aft main cargo cabin and rear access. Related methods of reconfiguring a base aircraft into a modified aircraft having such an aft main cargo cabin and rear access are also disclosed.

In one or more aspects, the present disclosure is directed to an aircraft comprising a fuselage, a forward section, an aft cargo section, and a rear access. The fuselage extends along a fuselage longitudinal axis. The forward section is disposed forwardly in the fuselage. The forward section has a forward main cabin with a first deck floor and a first height measured from the first deck floor. The aft cargo section is disposed in the fuselage rearward of the forward section. The aft cargo section has an aft main cargo cabin with a second deck floor and a second height measured from the second deck floor. The second deck floor is disposed below a level of the first deck floor. The second height is greater than the first height. The rear access is openable and disposed aft of the aft cargo section and configured to provide access to the aft main cargo cabin from behind the fuselage, longitudinally along the fuselage longitudinal axis. In examples, the forward section is a forward passenger section with one or two passenger levels, or a forward cargo section. In examples, the rear access is a swing tail.

In other aspects, the disclosure relates to a modified aircraft, with modifications relative to a base aircraft. The modified aircraft comprises a fuselage, a forward section, an aft cargo section, and a rear access. The fuselage extends along a fuselage longitudinal axis. The fuselage has a crown section that is substantially identical to a crown section of the base aircraft. The forward section is disposed forwardly in the fuselage. The forward section is substantially geometrically identical to the base aircraft. The forward section has a forward main cabin with a first deck floor and a first height measured from the first deck floor. The aft cargo section is disposed in the fuselage rearward of the forward section. The aft cargo section has an aft main cargo cabin with a second deck floor and a second height measured from the second deck floor. The second deck floor is lowered relative to the base aircraft and disposed below a level of the first deck floor. The second height is greater than the first height. The rear access is openable and disposed aft of the aft cargo section and configured to provide access to the aft main cargo cabin from behind the fuselage, longitudinally along the fuselage longitudinal axis. The modified aircraft has a maximum cargo dimension that is more than a base maximum cargo dimension of the base aircraft. The maximum cargo dimension is a height or a length. In examples, the rear access is a swing tail.

In other aspects, the disclosure relates to a method of reconfiguring a base aircraft into a modified aircraft. The base aircraft comprises a fuselage a forward section, an aft section, a base maximum cargo dimension, and a fuselage surface geometry. The fuselage of the base aircraft has a crown section and extends along a fuselage longitudinal axis. The forward section of the base aircraft is disposed forwardly in the fuselage and has a forward main cabin with a first deck floor and a first height measured from the first deck floor. The aft section of the base aircraft is disposed in the fuselage rearward of the forward section and has an aft main cabin with a second deck floor. The method includes forming an aft cargo section having an aft main cargo cabin by lowering the second deck floor to be lower than the first deck floor while keeping the crown section substantially constant fore-to-aft. The aft main cargo cabin has a second height measured from the second deck floor that is greater than the first height. The method also includes adding an openable rear access disposed aft of the aft cargo section and configured to provide access to the aft main cargo cabin from behind the fuselage, longitudinally along the fuselage longitudinal axis. The modified aircraft has a maximum cargo dimension greater than the base maximum cargo dimension of the base aircraft. In examples, the adding the rear access includes adding a swing tail, but other forms of rear access are also disclosed. In examples, the modified aircraft has a fuselage surface geometry that is substantially the same as the fuselage surface geometry of the base aircraft.

The features, functions, and advantages that have been discussed can be achieved independently in various aspects or may be combined in yet other aspects further details of which can be seen with reference to the following description and the drawings.

BRIEF DESCRIPTION OF THE DRAWINGS

Having thus described the disclosure in general terms, reference will now be made to the accompanying drawings, which are not necessarily drawn to scale.

Figure 1:
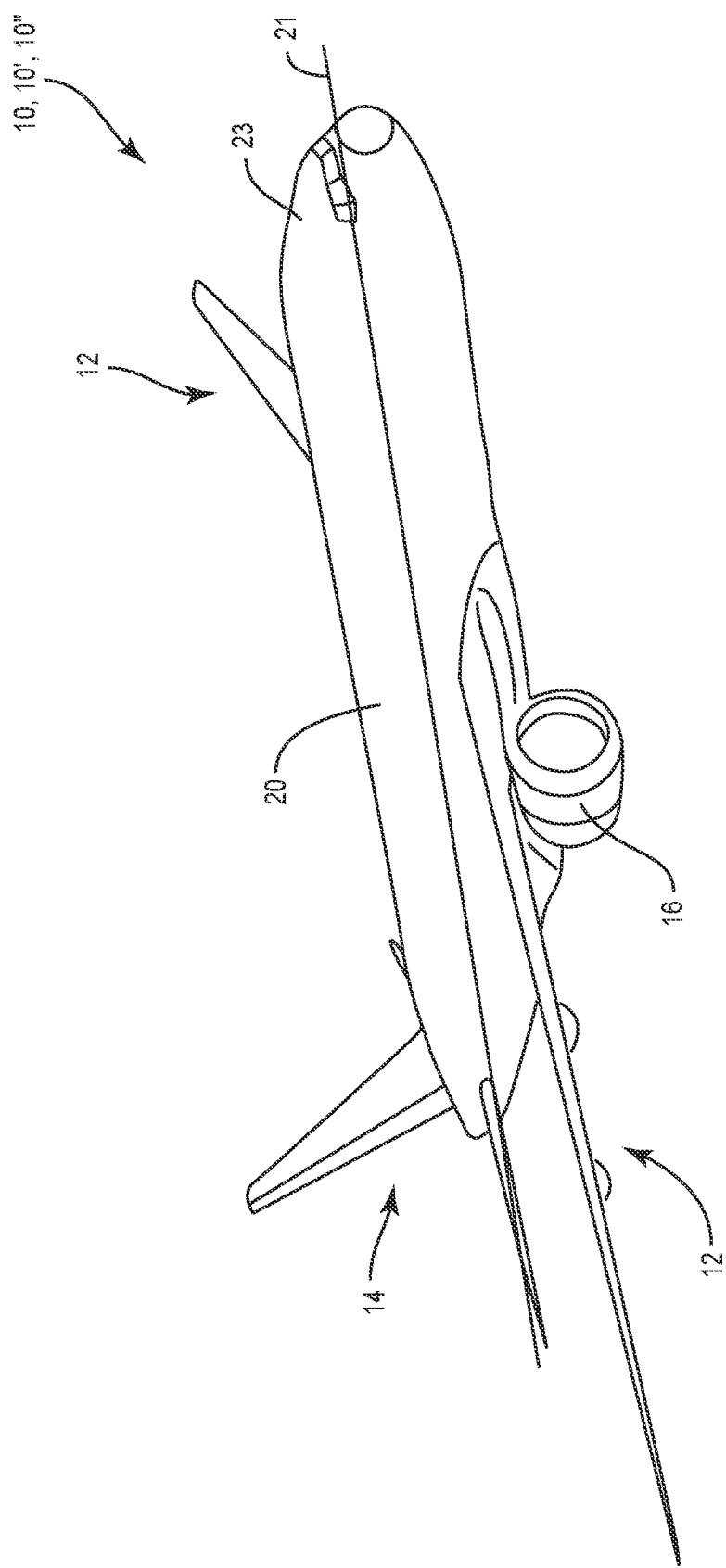

FIG. 1 is a perspective view of an example aircraft having a fuselage with an aft cargo section, which may be according to one or more of the aspects disclosed herein.

Figure 2A:
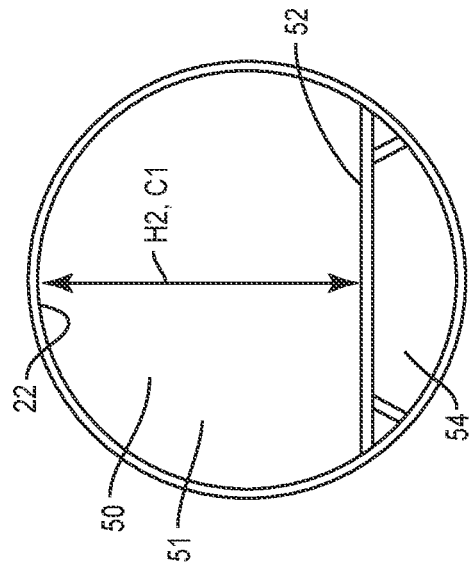
Figure 2B:
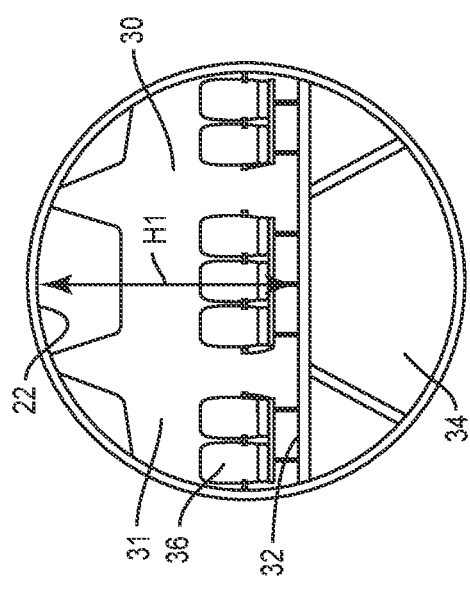
Figure 2:
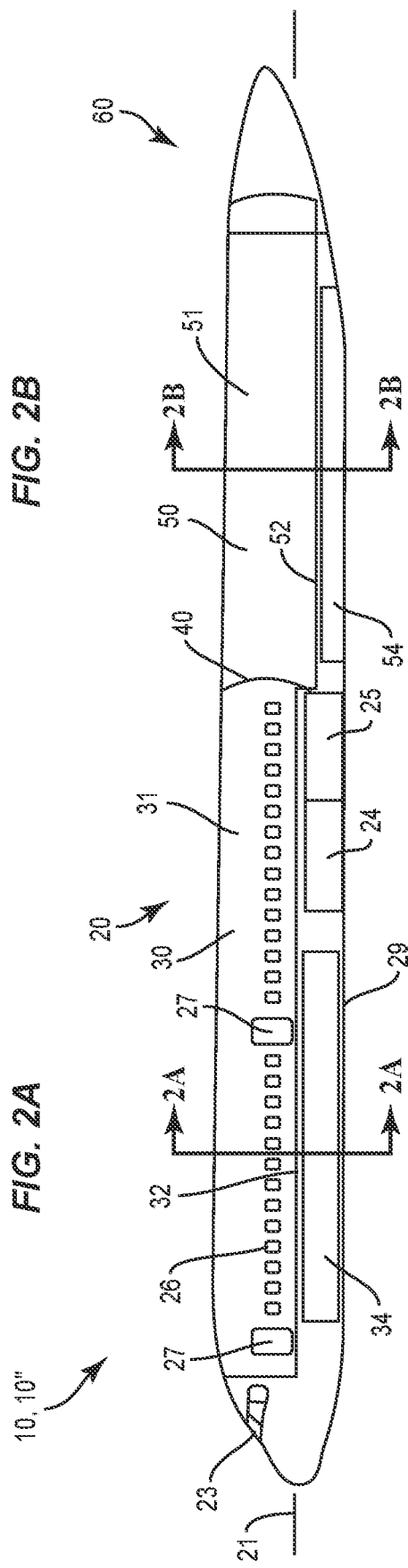

FIG. 2 shows a side view of the aircraft of FIG. 1, partially in section, with the tail assembly and wings omitted for clarity.

FIG. 2A shows a cross-section of the forward section of the fuselage, taken along line 2A-2A in FIG. 2.

FIG. 2B shows a cross-section of the aft cargo section of the fuselage, taken along line 2B-2B in FIG. 2.

Figure 3A:
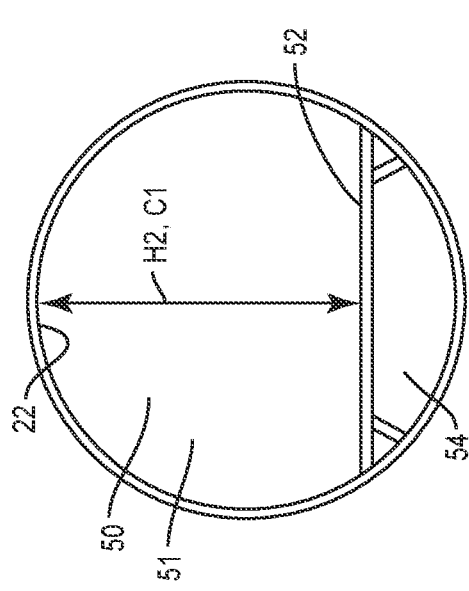
Figure 3B:
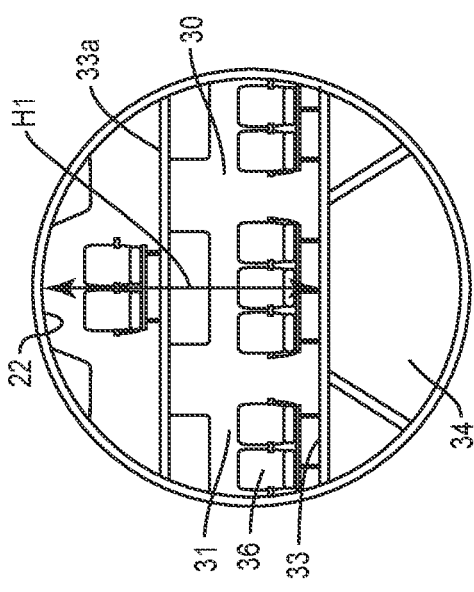
Figure 3:
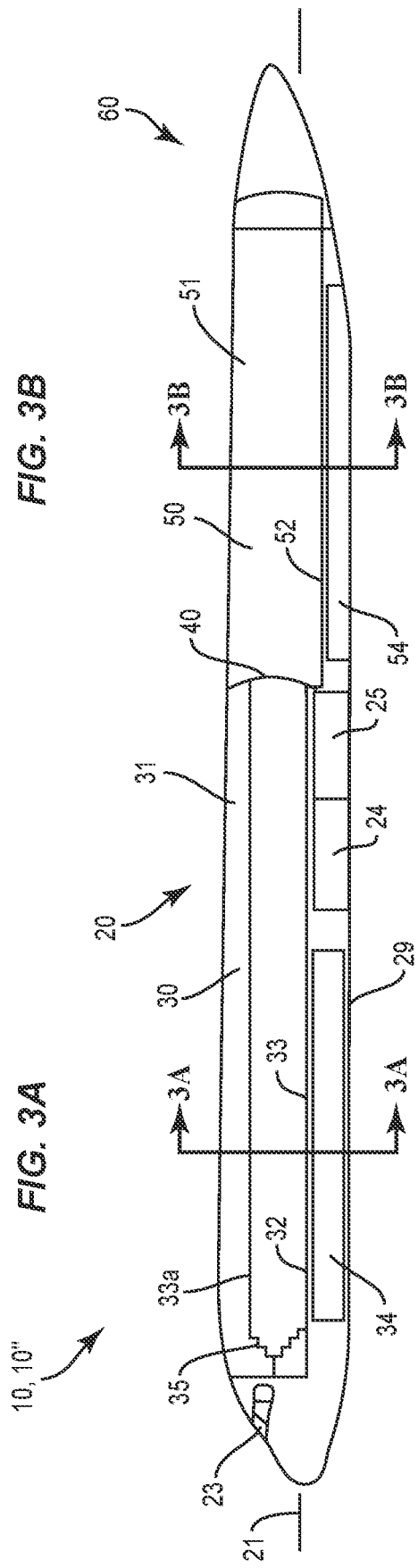

FIG. 3 is an illustration similar to FIG. 2, but showing an alternative forward section configuration.

FIG. 3A shows a cross-section of the forward section of the fuselage, taken along line 3A-3A in FIG. 3.

FIG. 3B shows a cross-section of the aft cargo section of the fuselage, taken along line 3B-3B in FIG. 3.

Figure 4A:
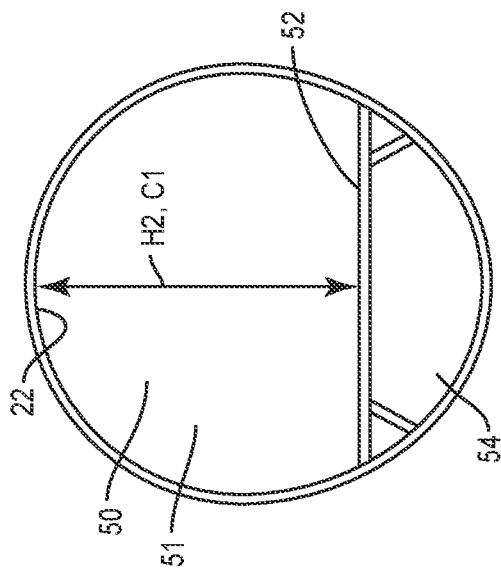
Figure 4B:
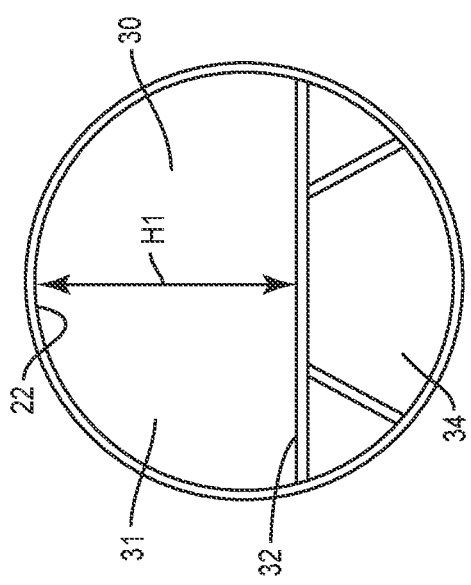
Figure 4:
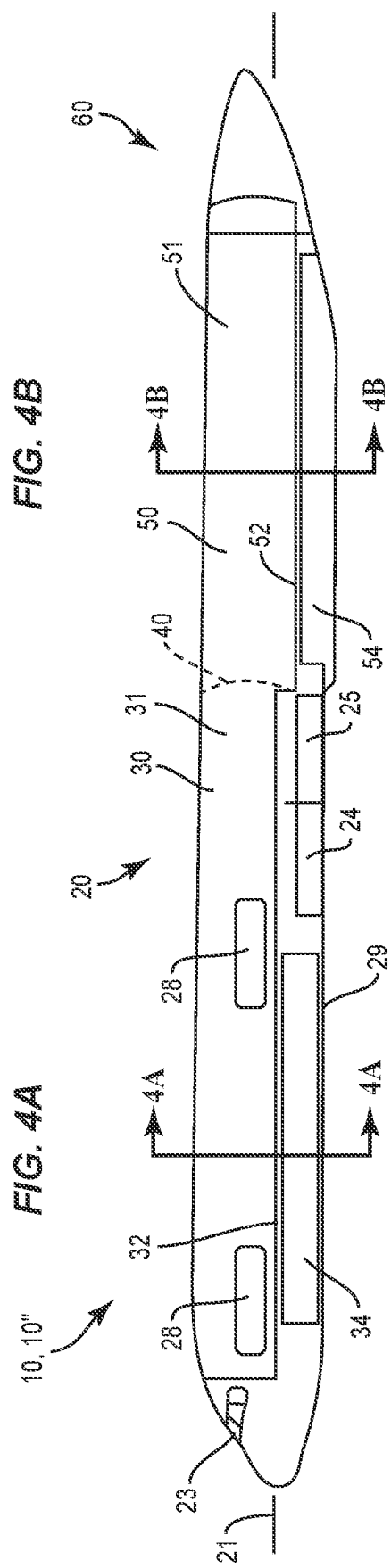

FIG. 4 is an illustration similar to FIG. 2, but showing an alternative forward section configuration.

FIG. 4A shows a cross-section of the forward section of the fuselage, taken along line 4A-4A in FIG. 4.

FIG. 4B shows a cross-section of the aft cargo section of the fuselage, taken along line 4B-4B in FIG. 4.

Figure 5:
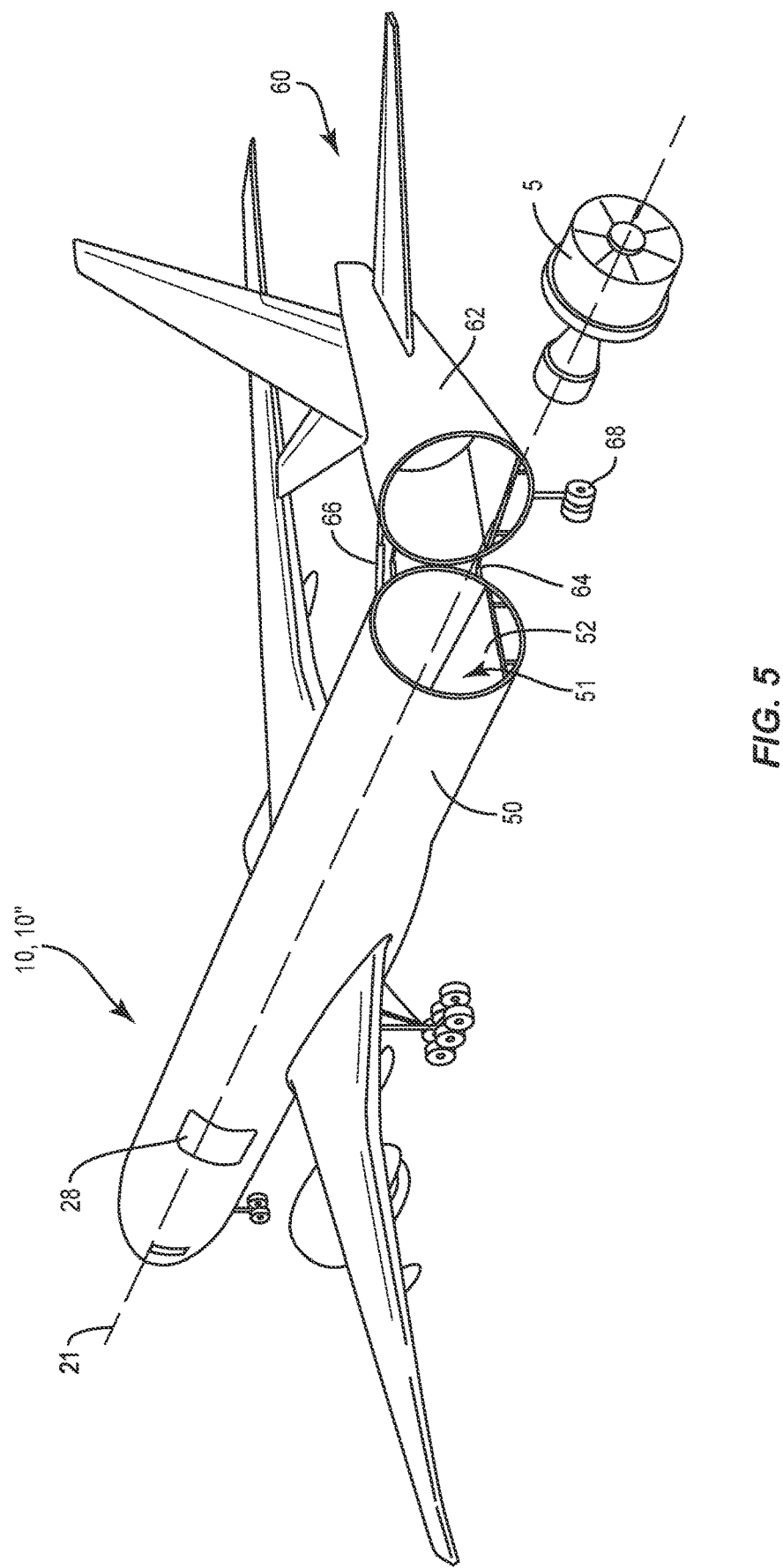

FIG. 5 shows a perspective view of the aircraft of FIG. 2, with a rear access of a swing tail that is open for cargo loading or unloading.

Figure 6A:
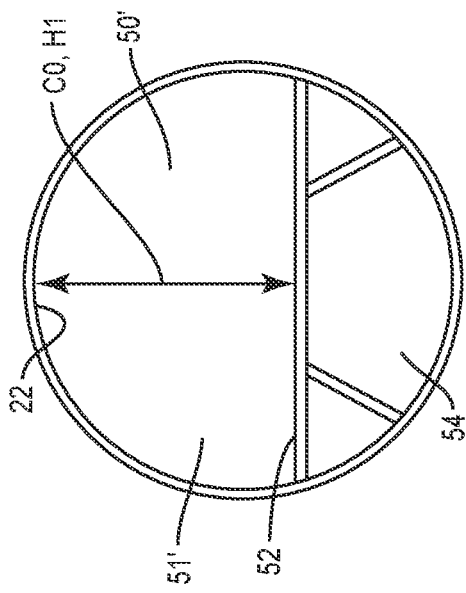
Figure 6B:
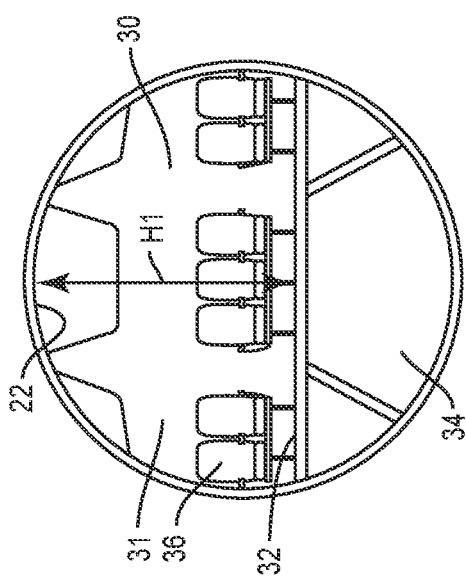
Figure 6:
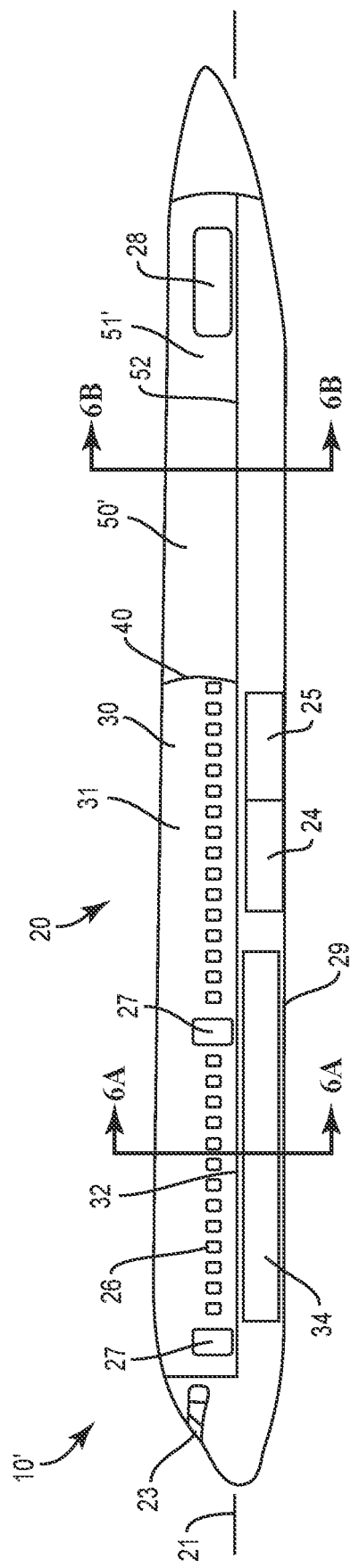

FIG. 6 shows a side view of a base aircraft, partially in section, with the tail assembly and wings omitted for clarity, with an illustrative base configuration.

FIG. 6A shows a cross-section of the forward section of the fuselage of a base aircraft, taken along line 6A-6A in FIG. 6.

FIG. 6B shows a cross-section of an aft section of the fuselage of a base aircraft, taken along line 6B-6B in FIG. 6.

Figure 7:
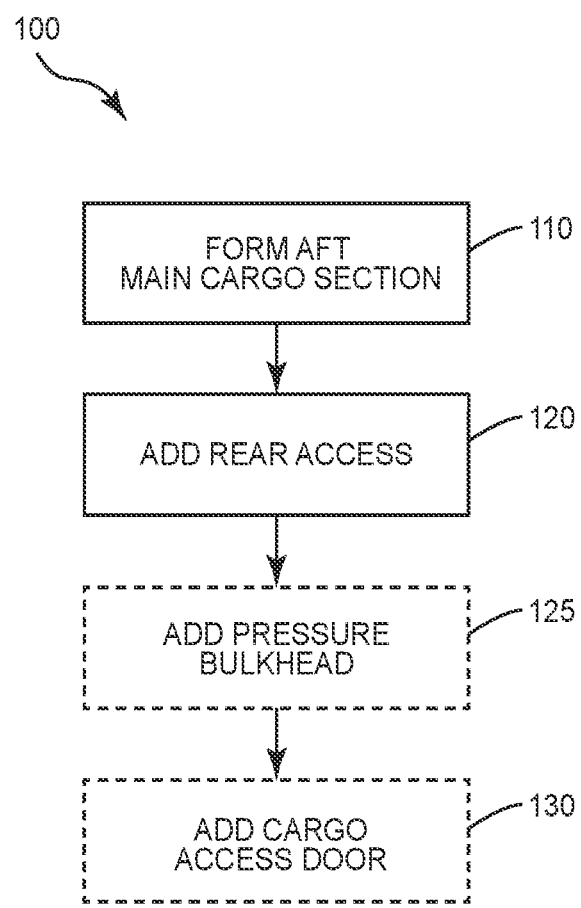

FIG. 7 shows a simplified process flowchart for a method of reconfiguring a base aircraft into a modified aircraft.

Figure 8:
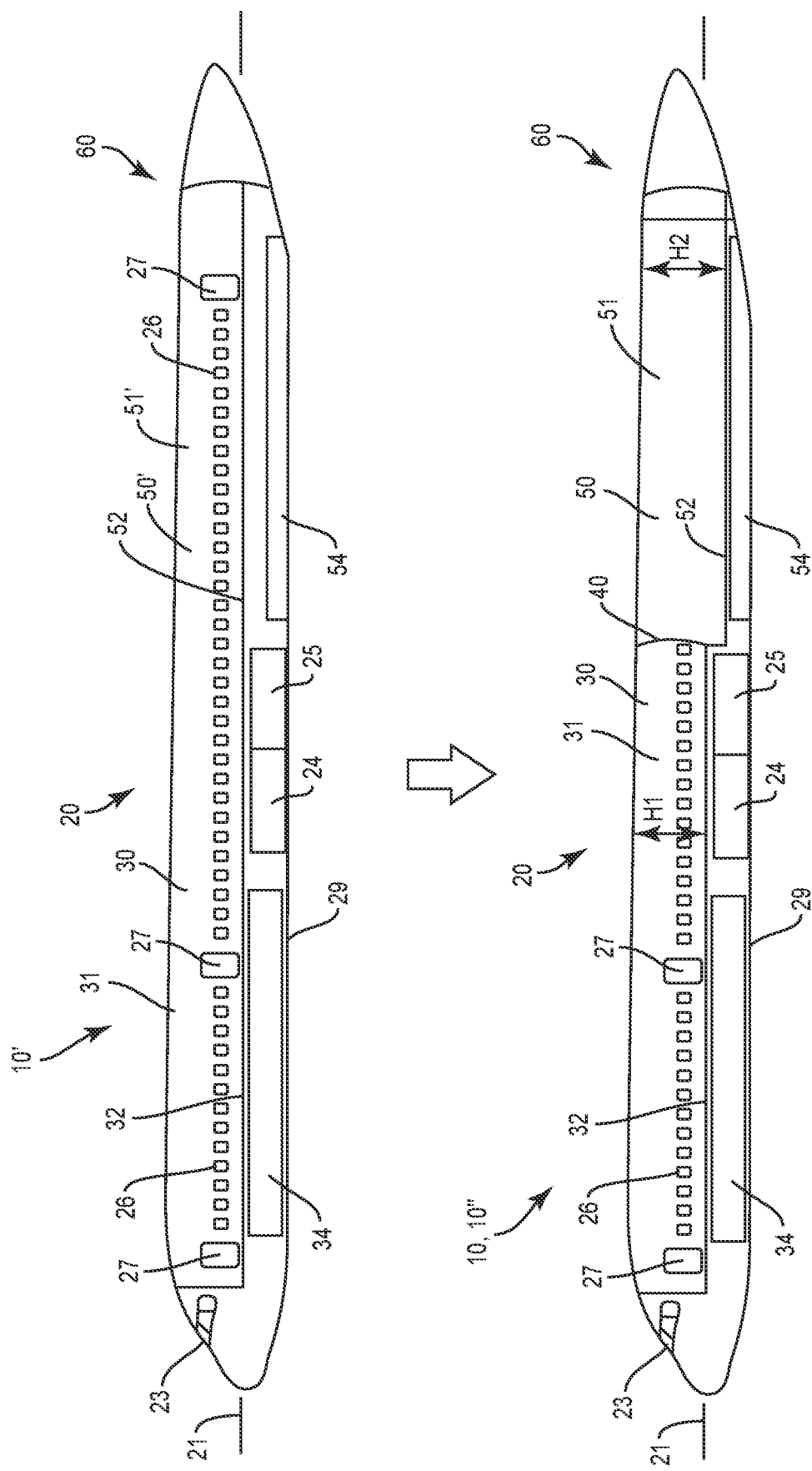

FIG. 8 shows a base aircraft and a corresponding modified aircraft.

DETAILED DESCRIPTION

Aspects of the present disclosure are generally directed to an aircraft 10 that has an aft cargo section 50 having an aft main cargo cabin 51 with a low deck floor, and a rear access 60 that is openable and configured to provide access to the aft main cargo cabin 51 from behind the fuselage 20. A forward section 30 of the fuselage 20 has a forward main cabin 31 with a first deck floor 32 and first height H1. The aft main cargo cabin 51 has a second deck floor 52, with a second height H2 measured from the second deck floor 52. The second height H2 is greater than the first height H1 so that the aft main cargo cabin 51 can accommodate cargo 5 with one or more larger dimensions. The aircraft 10 may be built with such an aft main cargo cabin 51 and rear access 60, or may be a modified aircraft 10" that includes such an aft main cargo cabin 51 and rear access 60. Related methods of reconfiguring a base aircraft 10' into a modified aircraft 10" having such an aft main cargo cabin 51 and rear access 60 are also disclosed.

Referring to FIG. 1, an aircraft 10 includes a generally cylindrical fuselage 20 that extends along a fuselage longitudinal axis 21, with an attached wing assembly 12 and a tail assembly 14. In the illustrated example, the aircraft 10 is propelled by jet engines 16 mounted on the wing assembly 12. The aircraft 10 may carry any of various types of payloads, including cargo and passengers.

Referring now particularly to FIGS. 1-5, the fuselage 20 broadly includes a forwardly positioned cockpit 23, a forward section 30, and an aft cargo section 50. The forward section 30 is disposed forwardly in the fuselage 20, aft of the cockpit 23, and typically immediately aft of the cockpit 23. The forward section 30 includes a forward main cabin 31 with a first deck floor 32. Although not shown in the figures, the first deck floor 32 optionally includes embedded hardware for attaching payloads to the floors. For example, the first deck floor 32 may have multiple seat tracks (not shown) that allow seats 36 for passengers to be attached to the first floor in various flexible configurations, and which allow the seats 36 to be removed in order to allow other forms of payloads, such as cargo, to be carried in the forward section 30 above the first deck floor 32. The forward main cabin 31 has a first height H1 measured from the first deck floor 32. The forward section 30 optionally includes a forward lower cargo compartment 34 disposed below the first deck floor 32. In some aspects, the forward main cabin 31 is a forward passenger cabin. As such, the forward section 30 optionally includes suitably placed and configured windows 26 and access doors 27. Note that when the forward main cabin 31 is a forward passenger cabin, the optional forward lower cargo compartment 34 is disposed below the first deck floor 32, to separate the passengers from the forward lower cargo compartment 34. The forward lower cargo compartment 34 optionally has a height that is less than the first height H1. A suitably placed door may provide side access to forward lower cargo compartment 34 for allowing loading/unloading of cargo; such door may be on the left or right side of the fuselage 20, as is desired. In other aspects, the forward main cabin 31 is a forward cargo section (e.g., FIG. 4), as discussed further below. Further, as is conventional, the fuselage 20 typically includes a center wing box 24 and main landing gear wheel well 25.

The forward main cabin 31, when configured as a forward passenger cabin, may have a single passenger seating level (e.g., FIG. 2). In other aspects, the forward passenger cabin has two levels, disposed one on top of the other, such as upper level 33a disposed above lower level 33 (e.g., FIG. 3). Suitable stairs 35 or other means may be provided for passenger access between the upper level 33a and the lower level 33.

The aft cargo section 50 is disposed in the fuselage 20 rearward of the forward section 30. The aft cargo section 50 has an aft main cargo cabin 51 with a second deck floor 52 and a second height H2 measured from the second deck floor 52. The second deck floor 52 is disposed below the level of the first deck floor 32. Accordingly, the second height H2 is greater than the first height H1. Stated another way, the first height H1 of the forward main cabin 31 is less than the second height H2 of the aft cargo section 50.

The aft main cargo cabin 51 is optionally separated from the forward main cabin 31 by a pressure bulkhead 40. In some aspects, the aft cargo section 50 is a pressurized cargo section; in other aspects, the aft cargo section 50 is an unpressurized cargo section. In some aspects, the aft cargo section 50 includes a lower aft cargo hold 54 disposed below the second deck floor 52. In some aspects, the aft main cargo cabin 51 further includes means to position and/or move cargo in the aft cargo section 50. Such means for positioning and/or moving may take any suitable form, such as a cargo roller tray, a cargo ball mat, a cargo lock mechanism, a mobile crane member, a winch member, and/or a mechanism to lift a portion of cargo over a step-up in cargo floor level (e.g., at an interface between first deck floor 32 and second deck floor 52). The fuselage 20 may have a consistent level of keel 29 corresponding to both the forward section 30 and the aft cargo section 50, or, as discussed further below, the fuselage 20 in the aft cargo section 50 may have a lower keel 29 than in the fuselage 20 corresponding to the forward section 30.

The aircraft 10 also includes an openable rear access 60. The rear access 60 is openable and disposed aft of the aft cargo section 50 and configured to provide access to the aft main cargo cabin 51 from behind the fuselage 20, longitudinally along the fuselage longitudinal axis 21. In some aspects, the rear access 60 is a swing tail 62. See FIG. 5. The swing tail 62 includes the vertical stabilizer assembly and horizontal stabilizers, and is configured to pivot open about hinges 64. The swing tail 62 optionally includes one or more actuators 66 for opening the swing tail 62, with the one or more actuators 66 advantageously disposed internal to the fuselage 20 when the swing tail 62 is closed. Suitable locking mechanisms and seals are provided for the swing tail 62 to keep the swing tail 62 in position when closed, and to maintain pressurization inside the aft cargo section 50 if appropriate. The swing tail 62 optionally includes a retractable tail skid wheel 68. While a swing tail 62 is believed advantageous, in other aspects, the rear access 60 takes the form of a movable rear cargo ramp and/or clamshell type doors.

From the above, it should be apparent that the aircraft 10 may be in a variety of configurations, all with an aft main cargo cabin 51 and a rear access 60. In one configuration, the aircraft 10 has a cargo-cargo configuration (e.g., FIG. 4) where the forward main cabin 31 is a cargo section, and with or without a forward lower cargo compartment 34 and/or a lower aft cargo hold 54, and with or without a lowered keel 29 corresponding to the aft cargo section 50. In another configuration, the aircraft 10 has a passenger-cargo configuration where the forward main cabin 31 is a forward passenger cabin with a single level (e.g., FIG. 2), and with or without a forward lower cargo compartment 34 and/or a lower aft cargo hold 54, and with or without a lowered keel 29 corresponding to the aft cargo section 50. In still another configuration, the aircraft 10 has a dual passenger-cargo configuration where the forward main cabin 31 is a forward passenger cabin with two or more passenger levels (e.g., FIG. 3), and with or without a forward lower cargo compartment 34 and/or a lower aft cargo hold 54, and with or without a lowered keel 29 corresponding to the aft cargo section 50.

Note that the aft main cargo cabin 51 is able to carry cargo of greater height, such as cargo 5 like a rocket motor shown in FIG. 5, that the forward main cabin 31 (when the forward main cabin 31 is in a cargo configuration), due to the second height H2 being greater than the first height H1. As mentioned above, the forward main cabin 31 may be a forward cargo section. In some aspects, the forward main cabin 31 is fully or partially open to the aft main cargo cabin 51, and not separated by a pressure bulkhead 40. For such arrangements, the forward main cabin 31 is operatively connected to the aft main cargo cabin 51 such that a long piece of cargo can extend into both the forward main cabin 31 and the aft main cargo cabin 51 simultaneously. Thus, the aircraft 10 is able to carry longer cargo than could fit in just the forward main cabin 31 or the aft main cargo cabin 51 alone. Because cargo can be loaded from the rear, generally along the fuselage longitudinal axis 21 (due to the rear access 60), long, straight pieces of cargo, such as long wind turbine blades or rocket engines, can be carried by the aircraft 10. Accordingly, the aircraft 10 a larger maximum cargo dimension C1 to be accommodated, where the maximum cargo dimension is a height and/or a length, depending on the configuration of the aircraft 10.

Thus, as disclosed herein, the aircraft 10, in one or more examples, includes a fuselage 20 extending along a fuselage longitudinal axis 21, a forward section 30, an aft cargo section 50, and a rear access 60. The forward section 30 is disposed forwardly in the fuselage 20, and has forward main cabin 31 with a first deck floor 32 and a first height H1 measured from the first deck floor 32. The aft cargo section 50 is disposed in the fuselage 20 rearward of the forward section 30. The aft cargo section 50 has an aft main cargo cabin 51 with a second deck floor 52 and a second height H2 measured from the second deck floor 52. The second deck floor 52 is disposed below a level of the first deck floor 32. The second height H2 is greater than the first height H1. The rear access 60 is openable and disposed aft of the aft cargo deck section, and is configured to provide access to the aft main cargo cabin 51 from behind the fuselage 20, longitudinally along the fuselage longitudinal axis 21.

In some aspects, the aircraft 10 is originally manufactured with the aft main cargo cabin 51 and rear access 60 as described above. Alternatively, an existing "base aircraft" 10' (see FIG. 6 and FIG. 8) can be modified to have the aft main cargo cabin 51 and rear access 60 described herein. Thus, a resulting modified aircraft 10", with modifications relative to a base aircraft 10', includes a fuselage 20, a forward section 30, an aft cargo section 50, and a rear access 60. The fuselage 20 extends along fuselage longitudinal axis 21. The fuselage 20 has a crown section 22 that is substantially identical to the crown section 22 of the base aircraft 10'. The forward section 30 is disposed forwardly in the fuselage 20. The forward section 30 is substantially geometrically identical to the base aircraft 10'. The forward section 30 has a forward main cabin 31 with a first deck floor 32 and a first height H1 measured from the first deck floor 32. The aft cargo section 50 is disposed in the fuselage 20 rearward of the forward section 30. The aft cargo section 50 has an aft main cargo cabin 51 with a second deck floor 52 and a second height H2 measured from the second deck floor 52. The second deck floor 52 is lowered relative to the base aircraft 10' and is disposed below the level of the first deck floor 32. The second height H2 of the aft main cargo cabin 51 is less than the first height H1 of the forward main cabin 31. The rear access 60 is disposed aft of the aft cargo section 50 and openable and configured to provide access to the aft main cargo cabin 51 from behind the fuselage 20, longitudinally along the fuselage longitudinal axis 21. The modified aircraft 10" has a maximum cargo dimension C1 that is more than a maximum cargo dimension C1 of the base aircraft 10'. The maximum cargo dimension C1 is a height and/or a length.

The modified aircraft 10" optionally includes any of the aspects described above, alone or in any combination. Thus, in some aspects of the modified aircraft 10", the forward main cabin 31 is operatively connected to the aft main cargo cabin 51 such that a long piece of cargo can extend into both the forward main cabin 31 and the aft main cargo cabin 51 simultaneously; and/or the fuselage 20 corresponding to the aft cargo section 50 has a lowered keel 29 in comparison to the base aircraft 10'; and/or the forward main cabin 31 is a forward cargo section or forward passenger cabin; and/or the aft cargo section 50 is a pressurized cargo section (e.g., the forward main cabin 31 and the aft main cargo cabin 51 are separated by a pressure bulkhead 40), or the aft cargo section 50 is an unpressurized cargo section; and/or the rear access 60 is a swing tail 62; and/or a lower aft cargo hold 54 is disposed below the aft main cargo cabin 51 and the second deck floor 52 separates the aft main cargo cabin 51 from the lower aft cargo hold 54.

In some aspects, a base aircraft 10' is modified into a modified aircraft 10". See FIG. 8. Note that the base aircraft 10' has a passenger/cargo configuration (see FIG. 6), or a passenger-passenger configuration (see FIG. 8), or a cargo-cargo configuration (not shown), or any other known configuration. The base aircraft 10' has a fuselage 20, a forward section 30, and an aft section 50'. The fuselage 20 has a crown section 22 and extends along a fuselage longitudinal axis 21. The base aircraft 10' has base maximum cargo dimension C0 and a fuselage surface geometry. The forward section 30 of the base aircraft 10' is disposed forwardly in the fuselage 20. The forward section 30 of the base aircraft 10' includes forward main cabin 31 with a first deck floor 32 and a first height H1 measured from the first deck floor 32. The aft section 50' of the base aircraft 10' is disposed in the fuselage 20 rearward of the forward section 30 and has an aft main cabin 51' with a second deck floor 52. In the base aircraft 10', the second deck floor 52 is typically at the same level as the first deck floor 32. The base maximum cargo dimension C0 defines a maximum dimension of cargo that can be carried in the base aircraft 10'. Note that the base maximum cargo dimension C0 may optionally be defined by a distance between the second deck floor 52 in base aircraft 10' and the crown (where the aft main cabin 51' is for cargo), or may be defined by a height/width/length of lower aft cargo hold 54 in base aircraft 10' if present. The fuselage surface geometry of the base aircraft 10' relates to the geometry of the fuselage surfaces of the base aircraft 10'. The method (100) of reconfiguring a base aircraft 10' into the modified aircraft 10" configuration includes forming (110) an aft cargo section 50 having an aft main cargo cabin 51 by lowering the second deck floor 52 to be lower than the first deck floor 32 while keeping the crown section 22 substantially constant fore-to-aft. Thus, the second deck floor 52 in the aft main cargo cabin 51 is lower than the first deck floor 32. The resulting aft main cargo cabin 51 has a second height H2 measured from the second deck floor 52 that is greater than the first height H1. The method continues with adding (120) a rear access 60 that is openable and disposed aft of the aft cargo section 50 and configured to provide access to the aft main cargo cabin 51 from behind the fuselage 20, longitudinally along the fuselage longitudinal axis 21. The resulting configuration of the modified aircraft 10" has a maximum cargo dimension C1 greater than the base maximum cargo dimension C0 of the base aircraft 10'. As pointed out above, the maximum cargo dimension C1 is a height and/or a length. Optionally, the configuration of the modified aircraft 10" has a fuselage surface geometry that is substantially the same as the fuselage surface geometry of the base aircraft 10'.

In some aspects, the forming the aft cargo section 50 includes lowering the keel 29 of the fuselage 20 below the aft cargo section 50.

In some aspects, the forward main cabin 31 is a forward passenger cabin, and the method includes forming (125) a pressure bulkhead 40 between the forward section 30 and the aft cargo section 50.

In some aspects, the adding the rear access 60 includes adding a swing tail 62.

In some aspects, the forward section 30 is a forward cargo section, the maximum cargo dimension C1 is a length, and the method includes operatively connecting the aft main cargo cabin 51 with the forward main cabin 31 such that a long piece of cargo can extend into both the forward main cabin 31 and the aft main cargo cabin 51 simultaneously.

In some aspects, the lowering the second deck floor 52 includes positioning the second deck floor 52 between the aft main cargo cabin 51 and a lower aft cargo hold 54 disposed below the second deck floor 52, with the second deck floor 52 separating the aft main cargo cabin 51 from the lower aft cargo hold 54.

In some aspects, the forward main cabin 31 is a forward cargo section, and the method includes adding (130) a cargo access door 28 to the fuselage 20 above a level of the first deck floor 32 so as to provide side entry access to the cargo carrying area of the forward section 30.

From the above, it should be apparent that the modified aircraft 10" may be in a variety of configurations, all with an aft main cargo cabin 51 and a rear access 60. In one configuration, the modified aircraft 10" has a cargo-cargo configuration (e.g., FIG. 4) where the forward main cabin is a cargo section, and with or without a forward lower cargo compartment 34 and/or a lower aft cargo hold 54, and with or without a lowered keel 29 corresponding to the aft cargo section 50. In another configuration, the modified aircraft 10" has a passenger-cargo configuration where the forward main cabin 31 is a forward passenger cabin with a single level (e.g., FIG. 2), and with or without a forward lower cargo compartment 34 and/or a lower aft cargo hold 54, and with or without a lowered keel 29 corresponding to the aft cargo section 50. In still another configuration, the modified aircraft 10" has a dual passenger-cargo configuration where the forward main cabin 31 is a forward passenger cabin with two or more passenger levels (e.g., FIG. 3), with or without a forward lower cargo compartment 34 and/or a lower aft cargo hold 54, and with or without a lowered keel 29 corresponding to the aft cargo section 50.

In some aspects, aircraft 10, base aircraft 10', and/or modified aircraft 10" are so-called widebody aircraft. In some aspects, aircraft 10, base aircraft 10', and/or modified aircraft 10" are so-called narrowbody aircraft.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure may, of course, be carried out in other ways than those specifically set forth herein without departing from essential characteristics of the disclosure.

The present embodiments are to be considered in all respects as illustrative and not restrictive, and all changes coming within the meaning and equivalency range of the appended claims are intended to be embraced therein.

What is claimed is:

1. An aircraft, comprising:
a fuselage extending along a fuselage longitudinal axis;
a forward section disposed forwardly in the fuselage; the forward section having a forward main cabin with a first deck floor and a first height measured from the first deck floor;
an aft cargo section disposed in the fuselage rearward of the forward section; the aft cargo section having an aft main cargo cabin with a second deck floor and a second height measured from the second deck floor; the second deck floor disposed below a level of the first deck floor;
wherein the second height is greater than the first height; and
an openable rear access disposed aft of the aft cargo section and configured to provide access to the aft main cargo cabin from behind the fuselage, longitudinally along the fuselage longitudinal axis;
wherein the forward section and the aft cargo section are separated by a pressure bulkhead.

2. The aircraft of claim 1, wherein the forward main cabin is a forward cargo section.

3. The aircraft of claim 2, wherein the forward cargo section is operatively connected to the aft main cargo cabin.

4. The aircraft of claim 1:
wherein the forward main cabin is a forward passenger cabin; and
further comprising a forward lower cargo compartment disposed below the first deck floor.

5. The aircraft of claim 4, wherein the forward passenger cabin has an upper level disposed above a lower level.

6. The aircraft of claim 1, wherein the openable rear access is a swing tail.

7. The aircraft of claim 1, wherein the aft cargo section is a pressurized cargo section.

8. The aircraft of claim 1, wherein the aft cargo section is an unpressurized cargo section.

9. The aircraft of claim 1, wherein the fuselage has a lower keel corresponding to the aft cargo section and corresponding to the forward section.

10. The aircraft of claim 1, further comprising a center wing box and a main landing gear wheel well positioned underneath the forward main cabin.

11. A modified aircraft, with modifications relative to a base aircraft, the modified aircraft comprising:
a fuselage extending along a fuselage longitudinal axis; the fuselage having a crown section that is substantially identical to a crown section of the base aircraft;
a forward section disposed forwardly in the fuselage; wherein the forward section is substantially geometrically identical to the base aircraft, the forward section having a forward main cabin with a first deck floor and a first height measured from the first deck floor;
an aft cargo section disposed in the fuselage rearward of the forward section; the aft cargo section having an aft main cargo cabin with a second deck floor and a second height measured from the second deck floor; the second deck floor being lowered relative to the base aircraft and being disposed below a level of the first deck floor;
wherein the second height is greater than the first height; and
an openable rear access disposed aft of the aft cargo section and configured to provide access to the aft main cargo cabin from behind the fuselage, longitudinally along the fuselage longitudinal axis; and
wherein the modified aircraft has a maximum cargo dimension that is more than a base maximum cargo dimension of the base aircraft;
wherein the forward section is pressurized and the aft cargo section is unpressurized.

12. The modified aircraft of claim 11, wherein the maximum cargo dimension is a height.

13. The modified aircraft of claim 11, wherein the forward section is a forward cargo section.

14. The modified aircraft of claim 11, wherein the rear access is a swing tail.

15. The aircraft of claim 11, further comprising a pressure bulkhead positioned between the forward section and the aft cargo section.

16. A method of reconfiguring a base aircraft into a modified aircraft, the base aircraft comprising a fuselage having a crown section and extending along a fuselage longitudinal axis; a forward section disposed forwardly in the fuselage and having a forward main cabin with a first deck floor and a first height measured from the first deck floor; an aft section disposed in the fuselage rearward of the forward section and having an aft main cabin a second deck floor; a base maximum cargo dimension; and a fuselage surface geometry; the method comprising:
forming an aft cargo section having an aft main cargo cabin by lowering the second deck floor to be lower than the first deck floor while keeping the crown section substantially constant fore-to-aft; wherein the aft main cargo cabin has a second height measured from the second deck floor that is greater than the first height;
adding an openable rear access disposed aft of the aft cargo section and configured to provide access to the aft main cargo cabin from behind the fuselage, longitudinally along the fuselage longitudinal axis;
forming a pressure bulkhead between the forward section and the aft cargo section; and
wherein the modified aircraft has a maximum cargo dimension greater than the base maximum cargo dimension of the base aircraft.

17. The method of claim 16, wherein forming the aft cargo section comprises lowering a keel of the fuselage below the aft cargo section.

18. The method of claim 16:
wherein the forward main cabin is a forward passenger cabin.

19. The method of claim 16, wherein the adding the rear access comprises adding a swing tail.

20. The method of claim 16, wherein the modified aircraft has a fuselage surface geometry that is substantially the same as the fuselage surface geometry of the base aircraft.

* * * * *